Patented June 19, 1945

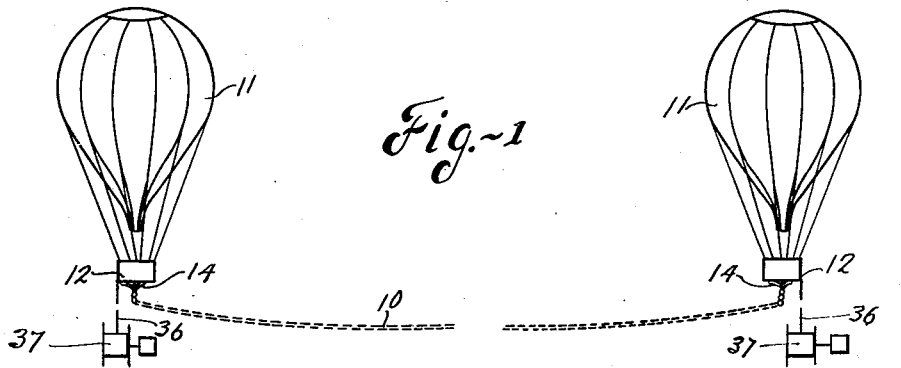
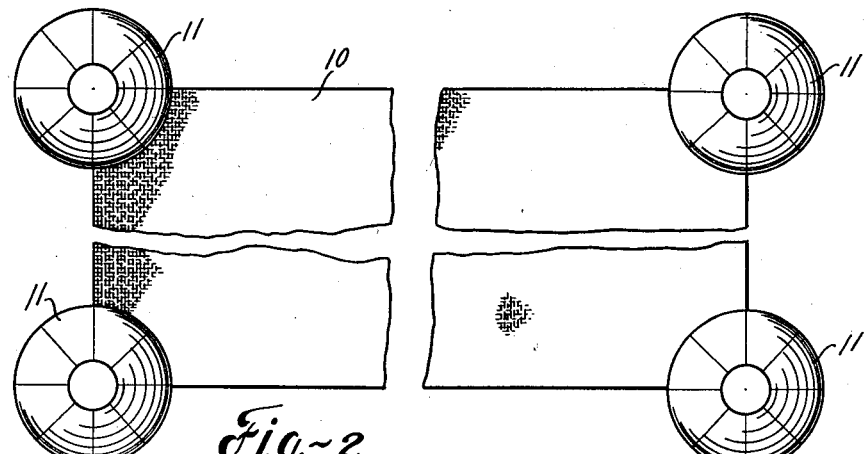
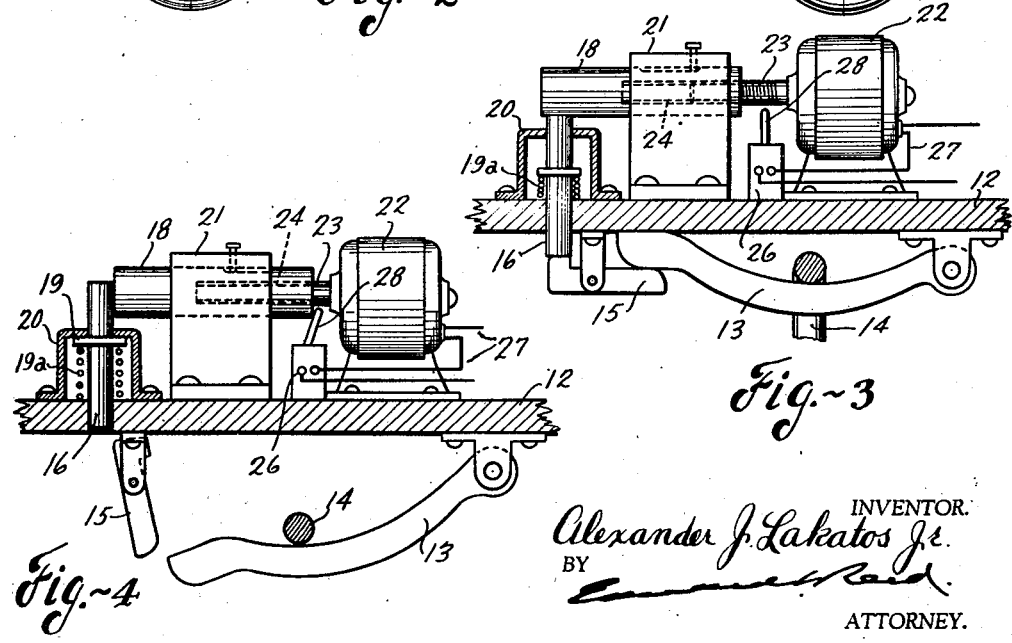

2,378,563

UNITED STATES PATENT OFFICE 2,378,563

PROTECTING APPARATUS

Alexander J. Lakatos, Jr., Dayton, Ohio

Application January 4, 1943, Serial No. 471,291

11 Claims. (Cl. 89—36)

This invention relates to an apparatus for defending a selected area, such as an airfield, a barrack, an ammunition dump or the like, against attack by aircraft.

One object of the invention is to provide an aircraft destroying device and means whereby it may be supported normally in an inoperative position in which it cannot be easily detected by attacking aircraft and may be rendered operative when aircraft approach or enter the space above the area to be protected.

A further object of the invention is to provide an apparatus comprising a structure of large area and means to support said structure above or adjacent to the area to be protected at an altitude greater than that at which attacking aircraft usually operate, and to release the same, after attacking aircraft have entered the space beneath the same, for movement into contact with or into the path of such aircraft and thereby cause the same to crash.

A further object of the invention is to provide such a device which may be released from its supports by remote control.

A further object of the invention is to provide means for releasably connecting such a device with a support which will be simple in construction and positive in operation.

Other objects of the invention may appear as the apparatus is described in detail.

Figure 5:
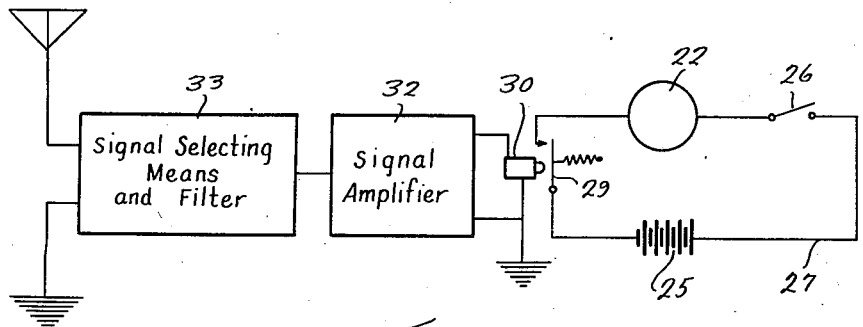
Figure 6:
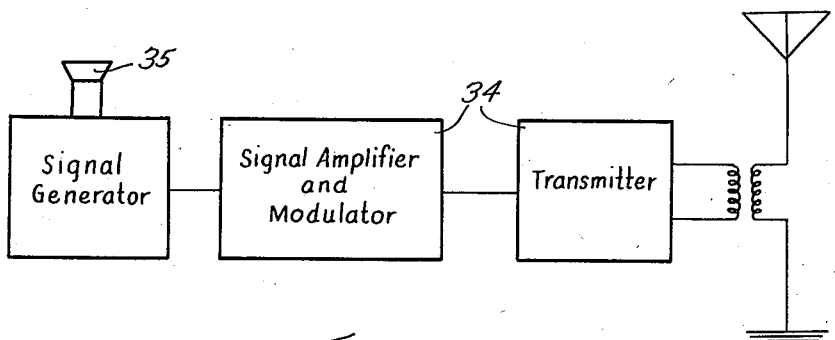

In the acompanying drawings Fig. 1 is a side elevation, partly broken away, of an apparatus embodying my invention; Fig. 2 is a plan view of such an apparatus, partly broken away; Fig. 3 is a side elevation of the releasing mechanism, showing the same in its operative position; Fig. 4 is a similar view of the releasing mechanism, showing the same in a released position; Fig. 5 is a diagram of the motor circuit and the radio receiving unit; and Fig. 6 is a diagram of the radio transmitting unit.

In these drawings I have illustrated one embodiment of the invention but it is to be understood that the apparatus may take various forms and may be controlled in various ways without departing from the substance of the invention.

In the embodiment here illustrated the aircraft destroying device is in the form of a flexible structure 10, such for example as a large mesh steel net, which is supported at high altitude in a substantially horizontal position by a plurality of balloons 11. The flexible structure is of a size sufficient to enable it to extend over a large area to be protected or over an adjacent area over which attacking aircraft would pass, and in advance of the point or points at which the bombs would be released, one or more such structures being employed according to the size and character of the area to be protected. The flexible structure may be of any desired shape and is here shown as rectangular in shape and as supported by four balloons attached to the respective corners of the structure but the number of balloons used will, of course, depend largely on the size and weight of the flexible structure. The balloons may be of any suitable type but should be capable of rising to and supporting the flexible structure at very high altitudes at which both the flexible structure and the balloons will be practically invisible from the lower altitudes at which aircraft usually operate, and I prefer to use balloons of the type known as stratosphere balloons. Either free or captive balloons may be used and when the balloons are capable of rising in the stratosphere to an altitude where there is no appreciable wind it is preferable to use free balloons as the absence of cables further reduces the probability of the apparatus being detected by aircraft operating at normal altitudes. When captive balloons are employed they may be provided with steel cables 36 of small size which will not be visible at any great distance from an approaching aircraft and which may be controlled in any suitable manner, as by winches 37. The flexible structure is releasably connected with the several balloons and means are provided for releasing the several connections substantially simultaneously so that the structure will fall, in an approximately horizontal position, onto any aircraft which may be beneath the same and will destroy the propellers thereof or otherwise cause the aircraft to crash to the ground. The releasable connections may be of any suitable character and preferably each balloon is provided with a platform or basket 12 suspended therefrom which carries the releasable connections and the mechanism for actuating the same.

In the construction here illustrated a connecting or supporting member 13, such as a curved or hook shaped arm, is arranged below the platform of each balloon and is pivotally connected adjacent one end thereof with the platform. This connecting member extends through a link or ring 14 secured to the adjacent part of the flexible structure and is supported normally in a position to retain the link thereon and thereby support the flexible structure, the link being of such size that it is free to slip off the connecting member when the latter is released for movement about its pivotal axis by the weight of the flexible structure. That end of the connecting member opposite its pivoted end is supported on one end of a latch 15 pivotally mounted on the platform 12, the other end of the latch being engaged by a retaining member 16 which normally prevents the movement of the latch to releasing position. In the present instance the retaining member 16 is in the form of a plunger or pin slidably mounted in an opening in the platform 12, resting on the adjacent end of the latch and held against upward movement by a movable locking member 18. Thus when the locking member is moved out of the path of the retaining member the latter is free to be moved upwardly by the force exerted thereon by the latch and the weight of the flexible structure on the latch will move the latter about its pivotal axis, thereby releasing the connecting member 13 which then swings downwardly so that the link 14 will slip off the same and release the flexible structure from the balloon. The movement of the released retaining member 16 is limited in both directions by a collar 19 secured thereto and arranged in a housing 20 mounted on the platform 12, the space between the platform and the top of the housing being such as to permit the necessary movement of the retaining member but to retain the same at all times in the opening in the platform. If desired, a spring 19a may be confined between the collar and the platform to move the retaining member 16 upwardly out of the path of the latch 15.

It will be apparent therefore that the releasing of the flexible structure from the balloon is effected by moving the locking member 18 out of the path of the retaining member 16. This locking member may be of any suitable character and may be operated in various ways but is preferably controlled by electrical mechanism which is capable of remote control. In the form here shown the locking member is in the form of a strong stud slidably mounted in a horizontal guideway in the bracket 21 rigidly mounted on the platform 12, so that the outer end of the stud may be moved into and out of the path of the retaining member 16. The stud is normally in locking engagement with the retaining structure and is withdrawn from its locking position by an electric motor 22. The locking stud is held against rotation in the bracket 21 and a screw 23 attached to, or formed integral with, the shaft of the motor extends into a screw threaded socket 24 in the inner end of the locking stud, and the rotation of the screw by the motor will move the stud longitudinally and withdraw it from locking engagement with the retaining member 16, thereby releasing the flexible structure from the balloon. The current for operating the motor is preferably supplied by a battery 25 carried by the platform 12, and a normally closed switch 26 in the motor circuit 27 has an actuating member 28 so arranged in the path of the locking stud 18 that it will be engaged and actuated by the inner end of the stud to open the switch 26 and stop the motor after the flexible structure has been released.

The operation of the motor is initiated by closing a normally open switch 29 in the motor circuit 27. Any suitable means may be provided for closing this switch but preferably this is accomplished by power transmitted by radio, and as here shown the switch 29 is actuated by a relay 30 which is connected in circuit with the signal amplifier 32 of a radio receiving unit 33 which is shown diagrammatically in Fig. 5 and may be of a known or any suitable character. A radio transmitting unit 34, Fig. 6, of a known or any suitable character is installed within or adjacent to the area which is protected by the apparatus and is provided with a controlling device 35, such as a key or push button, by means of which an operator may cause to be transmitted to the receiving unit 33 the signal necessary to energize the relay 31 and close the motor switch. Preferably the signal is of an arbitrary and secret character to prevent the unauthorized release of the flexible structure 10. When attacking aircraft have entered or are about to enter the space beneath the flexible structure the operator causes the proper signal to be transmitted simultaneously to the receiving units of the several balloons, thereby causing the flexible structure as a whole to be released and to drop on said aircraft. When a plurality of flexible structures are employed they may be released simultaneously or, if desired, may be individually released, as by the use of different signals to energize the respective releasing devices.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus of the character described, a metallic net of large area, a plurality of captive balloons connected with said net at separated points to support the same in a substantially horizontal position at a high altitude, releasable means for connecting said net with said balloons, and remote controlled means for actuating said connecting means to release said net from said balloons.

2. In an apparatus of the character described, a flexible structure of large area, a plurality of captive balloons connected with said structure at separated points to support the same in a substantially horizontal position at a high altitude, electrically controlled means to disconnect said structure from said balloons, and remote controlled means to energize said disconnecting means.

3. In an apparatus of the character described, a flexible structure of large area, a plurality of captive balloons connected with said structure at separated points to support the same in a substantially horizontal position at a high altitude, electrically controlled means to disconnect said structure from said balloons, and means including a radio receiving unit and a remote transmitting unit to energize said electrically controlled means.

4. In an apparatus of the character described, a flexible structure of large area, a plurality of captive balloons connected with said structure at separated points to support the same in a substantially horizontal position at a high altitude, operable means to disconnect said structure from the respective balloons, motors to operate the respective disconnecting means, and remote controlled means for energizing said motors.

5. In an apparatus of the character described, a flexible structure of large area, a plurality of captive balloons to support said structure in a substantially horizontal position at a high altitude, releasable means connecting said structure with the respective balloons, each such means including a part which is movable to effect said release and a motor to operate said part, remote controlled means to initiate the operation of said motor, and means controlled by said movable part of said connecting means to interrupt the operation of said motor when said structure has been released.

6. In an apparatus of the character described, a flexible structure of large area, a plurality of captive balloons to support said structure in a substantially horizontal position at a high altitude, releasable means connecting said structure with the respective balloons, said means including a member carried by each balloon and movable into and out of a position to support an adjacent portion of said structure, means including a second movable member to releasably retain said first mentioned member in said supporting position, electrically controlled means to impart releasing movement to said second movable member, and remote controlled means to energize said electrically controlled means.

7. In an apparatus of the character described, a flexible structure of large area, a plurality of captive balloons to support said structure in a substantially horizontal position at a high altitude, a platform carried by each balloon, means including a movable member for releasably connecting said structure with said platform, means carried by said platform for controlling the movement of said movable member and including an electrically operated device, a source of electric current connected with said device, a radio receiving unit, and means controlled by said receiving unit to initiate the flow of current from said source of current to said electrically operated device.

8. In an apparatus of the character described, a flexible structure of large area, a plurality of captive balloons to support said structure in a substantially horizontal position at high altitudes, a platform carried by each balloon, a movable member for releasably connecting said structure with said platform, an electric motor supported by said platform and operatively connected with said movable member, a source of electric current carried by said platform, means including a switch for connecting said source of current with said motor, and means for actuating said switch including a radio receiving unit carried by said platform and a radio transmitting unit supported at a point remote from said platform.

9. In an apparatus of the character described, a flexible structure of large area, a plurality of captive balloons to support said structure in a substantially horizontal position at a high altitude, a platform carried by each balloon, a supporting member pivotally mounted on said platform and releasably engaging a part of said structure, a latch normally engaging said supporting member to retain the same in structure supporting position, means including a movable member to normally prevent the movement of said switch, a motor to actuate said movable member, and remote controlled means for energizing said motor.

10. In an apparatus of the character described, a flexible structure of large area, a plurality of captive balloons to support said structure in a substantially horizontal position at a high altitude, a platform carried by each balloon, a supporting member mounted on said platform for movement into and out of supporting relation to a part of said structure, means for normally retaining said supporting member in supporting relation to said structure including a locking device having a screw threaded socket, a screw extending into said socket, a motor for rotating said screw, and means for initiating the operation of said motor.

11. In an apparatus of the character described, a flexible structure of large area, a plurality of captive balloons to support said structure in a substantially horizontal position at a high altitude, a platform carried by each balloon, a supporting member mounted on said platform for movement into and out of supporting relation to a part of said structure, means for normally retaining said supporting member in supporting relation to said structure including a locking device having a screw threaded socket, a screw extending into said socket, a motor for rotating said screw, means for initiating the operation of said motor, and means controlled by the movement of said locking device for interrupting the operation of said motor.

ALEXANDER J. LAKATOS, Jr.